No. 12,184. REISSUED DEC. 15, 1903.

N. T. WORTHLEY & J. HEATON.

ACETYLENE GAS GENERATOR.

APPLICATION FILED JAN. 9, 1903.

2 SHEETS—SHEET 1.

Witnesses
Edward S. Day
Alfred H. Hildreth

Inventors
Nathaniel T. Worthley
Joseph Heaton
by their Attorneys
Phillips, Van Everen & Fish

THE NORRIS PETERS CO., PHOTO-LITHO., WASHINGTON, D. C.

No. 12,184. REISSUED DEC. 15, 1903.

N. T. WORTHLEY & J. HEATON.

ACETYLENE GAS GENERATOR.

APPLICATION FILED JAN. 9, 1903.

2 SHEETS—SHEET 2.

Witnesses
Edward S. Day
Alfred H. Hildreth

Inventors
Nathaniel T. Worthley
Joseph Heaton
by their Attorneys
Phillips, Van Everen & Fish

THE NORRIS PETERS CO., PHOTO-LITHO., WASHINGTON, D. C.

No. 12,184. Reissued December 15, 1903.

UNITED STATES PATENT OFFICE.

NATHANIEL T. WORTHLEY AND JOSEPH HEATON, OF BRUNSWICK, MAINE, ASSIGNORS, BY DIRECT AND MESNE ASSIGNMENTS, TO THE VICTORIA MANUFACTURING COMPANY, OF AUBURN, MAINE, A CORPORATION OF MAINE.

ACETYLENE-GAS GENERATOR.

SPECIFICATION forming part of Reissued Letters Patent No. 12,184, dated December 15, 1903.

Original No. 687,469, dated November 26, 1901. Application for reissue filed January 9, 1903. Serial No. 138,441.

*To all whom it may concern:*

Be it known that we, NATHANIEL T. WORTHLEY, a citizen of the United States, and JOSEPH HEATON, a subject of the King of Great Britain, both residents of Brunswick, in the county of Cumberland and State of Maine, have made a certain new and useful Invention in Acetylene-Gas Generators; and we declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
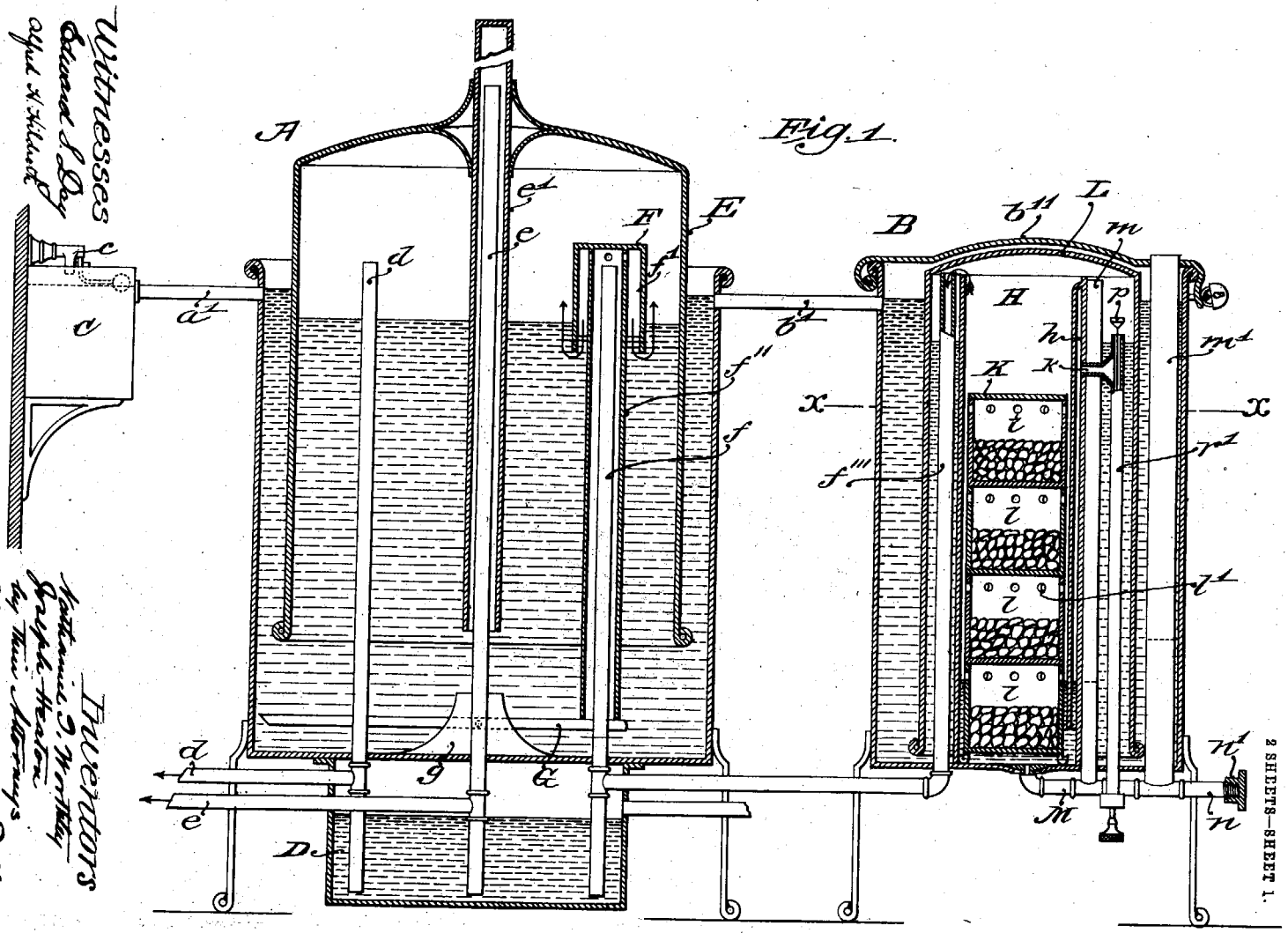
Figure 2:
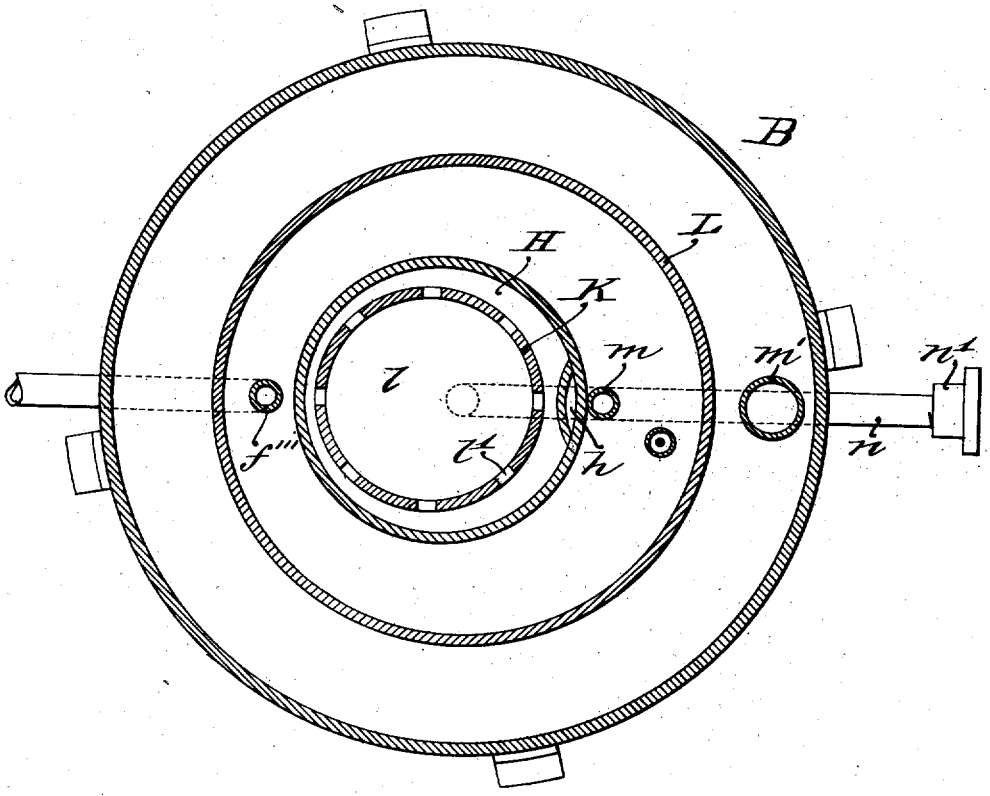

Figure 1 of the accompanying drawings is a central vertical section of our generator. Fig. 2 is a cross-section of the gas-generator on line *x x*.

The invention has relation to acetylene-gas generators; and it consists in the novel construction and combinations of parts, as hereinafter set forth.

In the accompanying drawings, illustrating the invention, the letter A designates the gas-receiver or gasometer, and B the gas-generator.

C is the water-supply, which is provided with an automatic valve *c* to maintain the level in the receiver-tank A and in the generator-tank B through connecting-pipes *a'* and *b'*.

D is a drip-chamber, attached to the bottom of the receiver-tank *a*, and into this drip-chamber extend the lower ends of the gas-outlet pipe *d*, blow-off pipe *e*, and gas-inlet pipe *f*.

E is the gasometer-bell, having a central tube *e'*, into which the blow-off pipe *e* extends.

F is the governor for the gas-inlet, consisting of an inverted holder *f'*, secured to the upper end of a tubular stem *f''*, into which the gas-inlet tube *f* extends. At the upper end of the stem *f''* are perforations through which the gas passes from the tubular stem into the governor-holder *f'*, the lower portion of which is below the water-line of the receiver-tank. The stem *f''* is long enough to engage an arm of the lever G, which is pivoted to a support *g* on the floor of the receiver-tank. The other arm of said lever is in the path of the gas-bell E, and when the bell descends on account of the lessening of the gas therein sufficiently to depress this arm of the lever the gas-governor is raised, decreasing its resistance and permitting a flow of the gas into the bell. This flow, however, takes place through the water, so that the governor serves as a washing device and a stop to prevent the return of gas to the generator.

The lever G is stopped by its pivotal support or in any other suitable manner to normally maintain the governing device F immersed to a given depth in the water of the gasometer.

The generator B consists mainly of a tank having a cover *b''*, which should be provided with locking devices, and inside of said tank a carbid-chamber H, within which is the carbid-holder K, and a gas-holder L, covering in the carbid-chamber and removable when the tank is opened. The carbid-pans are arranged in series one above another in the carbid-chamber, so that the holder consists of a series of chambers *l l*, each of which is provided with a set of perforations *l'* to admit water to the carbid. These sets of perforations are therefore at different levels. The gas-outlet pipe or tube *f'''* extends from near the top of the tank B downward through the bottom of said tank and then transversely to the leg of the gas-inlet tube in the receiver drip-chamber. The top of the gas-outlet tube is above the water-line, as is also the top of the carbid-chamber. In the wall of the carbid-chamber, a little above the top of the carbid-holder, is made a perforation *k* to allow entrance of water, this perforation being guarded on the inside of the carbid-chamber by a tube or covered way *h*, which extends nearly to the bottom of this chamber, so that water must pass into the chamber at the lower portion thereof.

In connection with the tank is provided an air-vent pipe M, which communicates, by means of an upwardly-extending branch *m*, with the interior of the gas-holder L and by means of an upwardly-extending branch *m'*, which extends through the tank-cover, with the external air. The open upper end of the tubular branch $m$ is below that of the gas-outlet tube and below that of the branch $m'$, which extends through the cover. This air-vent pipe is provided with an outlet $n$, which is usually kept closed by means of a screw-stopper $n'$. The pipe M is designed also to communicate with the bottom of the carbid-chamber.

In connection with the perforation or inlet $k$ for water, which is made in the wall of the carbid-chamber, is provided a stop-valve $p$, which is designed to be operated by means of a rod extending through a tube $r'$, secured in the tank. When the valve is pulled down to close the water-inlet $k$, the water can be drawn off from the carbid-chamber and from the air-vent tubes, and the generator can then be opened.

From the construction described it will be noted that the gas-generator consists of a central carbid-chamber having superposed carbid-pans, an inner water-chamber communicating with said carbid-chamber at the top only of the water-chamber, and an outer water-chamber communicating with said inner water-chamber at the bottom only thereof, such outer chamber having a water-supply from the gasometer.

The operation is as follows: The water passes from the supply-tank into the receiver-tank and thence into the generator-tank, filling both to the same level, which is kept constant by means of the ball-valve. The valve $p$, having been first adjusted, the water passes into pipe $r'$ and thence through the perforation $k$ in the wall of the carbid-chamber and through the passage or covered way $h$ therein to the bottom portion of the carbid-chamber, rising thence to the inlets of the sections of the carbid-holder, wetting the carbid and causing the generation of the acetylene gas, which passes through the pipe connections $f'''$ and $f$ into the gas-bell of the receiver, whence it passes off for use by the pipe $d$. This passage of the gas into the gas-bell raises the gas-bell from the lever and allows the gas-holding governor to fall to its seat and to offer sufficient resistance to the passage of the gas to maintain a water-pressure of four and one-half inches in the generator when the gas-bell is balanced to three inches. Before this pressure is reached the water in the inside of the water seal of the generator will have been displaced below the inlet $k$ and also below the inlets in the carbid-holder, the water in the carbid-chamber being forced into the air-vent pipe M, which acts as a relief-pipe for said water. This pipe serves as an air-vent pipe when the gas-holder L is being removed or replaced—that is, it serves to convey air from the outside air to the inside of the gas-bell when the gas-bell is being removed and to convey air from the gas-bell to the outside air when the gas-bell is being replaced. Gas being used from the bell it falls, engaging the lever and raising the water-seal governor, steadily decreasing the pressure in the generator until the water in the inner seal again rises above the inlet $k$, admitting more water to the carbid, generating more gas, and again displacing the water to its normal level in the inside of the water seal as before.

In the gas-bell it is designed to maintain a constant pressure of three inches, while in the generator the pressure varies from three inches to four and one-half inches. The water-seal governor comprises also a washer for the gas and a stop to prevent the return of gas to the generator. It is never completely raised from its water seal.

The relief or air-vent pipe M is also designed to serve an important purpose as a well, by means of which the water in the carbid-chamber can be measured, a graduated rod or scale being used for the purpose. In this manner it can be determined which section or pan of carbid the water has reached in its rising. When the gas-bell is off the lever, the pressure in the generator is always four and one-half inches, which, taken from the depth of water in the open branch of the pipe M, will show the height of water in the carbid-chamber. This relief or air-vent pipe M is designed to be of sufficient capacity to serve as a reservoir for the water which may be displaced from the inlet in carbid-pans when the pressure in the generator rises, as above described. The inlets $k$ and $l'$ form a double cut-off for the water in the carbid-chamber.

What we claim, and desire to secure by Letters Patent, is—

1. In acetylene-gas-generating apparatus, the combination of the gas-generator, consisting of the central carbid-chamber, the inner water-chamber surrounding said carbid-chamber and communicating therewith at the top only thereof, the outer water-chamber surrounding said inner chamber and communicating therewith at the bottom only thereof, the water-inlet from said inner chamber to said carbid-chamber, the gasometer, the pipe connecting said gasometer and the outer water-chamber of the gas-generator, and means for supplying water to said gasometer, substantially as specified.

2. In acetylene-gas-generating apparatus, the combination of the gas-generator, consisting of the central carbid-chamber, the inner water-chamber surrounding said carbid-chamber and communicating therewith at the top only thereof, the outer water-chamber surrounding said inner chamber and communicating therewith at the bottom only thereof, the vertical water-inlet tube in and extending to near the top of said inner chamber and having a communication with said inner chamber and with said carbid-chamber at the upper portion thereof, the covered way for conducting water from said inlet-tube to the bottom of said carbid-chamber, a vertical relief and air-vent pipe and measuring-well extending the full height of said generator and communicating with the atmosphere at the upper portion thereof and with the lower portion of said carbid-chamber at the lower portion thereof, the gasometer, the pipe connecting the gasometer with said outer water-chamber, and means for supplying water to said gasometer, substantially as specified.

3. In acetylene-gas-generating apparatus, the combination of the gas-generator, consisting of the central carbid-chamber, the inner water-chamber surrounding said carbid-chamber and communicating therewith at the top only thereof, the outer water-chamber surrounding said inner chamber and communicating therewith at the bottom only thereof, the vertical water-inlet tube in and extending to near the top of said inner chamber, said tube being open at the top and having a lateral communication with said carbid-chamber near the top thereof, the valve-rod in said tube controlling the admission of water at the top thereof, the covered way for conducting water from said inlet-tube to the bottom of said carbid-chamber, a vertical relief and air-vent pipe and measuring-well extending the full height of said generator and communicating with the atmosphere at the upper portion thereof and with the bottom of said carbid-chamber at the lower portion thereof, the gasometer, the tube connecting said gasometer and outer water-chamber, and means for supplying said gasometer with water, substantially as specified.

4. In acetylene-gas-generating apparatus, the combination of the gas-generator, consisting of the central carbid-chamber having the series of superposed pans or subchambers having lateral inlet-perforations therethrough, the inner water-chamber surrounding said carbid-chamber and communicating therewith at the top only thereof, the outer water-chamber surrounding said inner chamber and communicating therewith at the bottom only thereof, the water-inlet from said inner chamber to said carbid-chamber, the air-vent and relief pipe and measuring-well extending the full height of said generator and having a communication at the upper portion thereof with the atmosphere and at the lower portion thereof with the bottom of said carbid-chamber, said relief-pipe being of sufficient capacity to hold the water displaced from inlet into carbid-pans, substantially as specified.

5. In acetylene-gas-generating apparatus, the combination of the gas-generator, consisting of the central carbid-chamber, the inner water-chamber surrounding said carbid-chamber and communicating therewith at the top only thereof, the outer water-chamber surrounding said inner chamber and communicating therewith at the bottom only thereof, the water-inlet from said inner chamber to said carbid-chamber, the gasometer, the pipe connecting said gasometer and outer water-chamber of the generator, means for supplying water to said gasometer, the gasometer-bell, the gas-inlet tube for said gasometer, the governor controlling the exit of gas from said tube, and the lever device in the path of said bell and controlling said governor, substantially as specified.

6. In acetylene-gas-generating apparatus, the combination of the gas-generator, consisting of the central carbid-chamber, the inner water-chamber surrounding said carbid-chamber and communicating therewith at the top only thereof, the outer water-chamber surrounding said inner chamber and communicating therewith at the bottom only thereof, the vertical water-inlet tube in and extending to near the top of said inner chamber, said tube being open at the top and having a lateral communication with said carbid-chamber near the top thereof, the valve-rod in said tube controlling the admission of water at the top thereof, the covered way for conducting water from said inlet-tube to the bottom of said carbid-chamber, a vertical relief and air-vent pipe and measuring-well extending the full height of said generator and communicating with the atmosphere at the upper portion thereof and with the bottom of said carbid-chamber at the lower portion thereof, the gasometer, the tube connecting said gasometer and outer water-chamber of the generator, means for supplying said gasometer with water, the gasometer-bell, the gas-inlet tube for said gasometer, the governor and gas-washer controlling the exit of gas from said tube, and the lever device in the path of said bell and controlling said governor and gas-washer, substantially as specified.

7. In apparatus for generating acetylene gas, the combination with the gasometer, the gas-generator, and means for supplying the same with water from a common source, of the gasometer-bell, and its lever-actuated governing device, the carbid-chamber and carbid-holder having the double water-inlet and cut-off, the gas-holder covering in the carbid-chamber, and the combined air-vent and relief pipe, substantially as specified.

8. In acetylene-gas-generating apparatus, the gas-generator, consisting of the central carbid-chamber, the inner water-chamber surrounding said carbid-chamber and communicating therewith at the top only thereof, the outer water-chamber surrounding said inner chamber and communicating therewith at the bottom only thereof, and the double water-inlet and cut-off to said carbid-chamber and to the carbid in said chamber, substantially as specified.

9. In acetylene-gas-generating apparatus the gas-generator consisting, of the central carbid-chamber, the inner water-chamber surrounding said carbid-chamber and communicating therewith at the top only thereof, the outer water-chamber surrounding the said inner chamber and communicating therewith at the bottom only thereof, the water-inlet and cut-off from said chamber to said carbid-chamber, the gasometer, the water-supply pipe connecting said gasometer and generator, the drip-chamber, the gas-inlet and gas-outlet pipes of the gasometer having depending branches extending into said drip-chamber, and the blow-off pipe for said drip-chamber, substantially as specified.

10. In an apparatus for generating acetylene gas, the combination, with a carbid-chamber, of a water-sealed cover for said carbid-chamber, and a passage-way separated from the said carbid-chamber having a port or opening located above the normal level of the water on the inside of said water-sealed cover and communicating with the bottom part of said carbid-chamber for conveying water to the carbid-chamber upon a fall of pressure and consequent rise of water-level in the carbid-chamber, substantially as described.

11. In an apparatus for generating acetylene gas, the combination with a carbid-chamber, of a water-sealed cover for said carbid-chamber, the water on the inside of said water-sealed cover being in communication with said chamber through a port or opening located above the normal level of said water, a gasometer provided with a bell, and a governor controlled by said bell acting upon the descent of the bell to reduce the pressure of gas in the carbid-chamber so that the level of the water on the inside of said water-sealed cover shall rise and flood said port or opening so as to admit water to the carbid-chamber, substantially as described.

In testimony whereof we have hereunto affixed our names.

NATHANIEL T. WORTHLEY.
JOSEPH HEATON.

Witnesses:
FOREST E. LUDDEN,
ALBION E. TEDFORD.